(12) United States Patent
Del Toro (10) Patent No.: US 9,275,049 B2
(45) Date of Patent: Mar. 1, 2016

(54) PROTECTIVE CASE FOR PORTABLE ELECTRONIC DEVICE

(71) Applicant: Incipio Technologies, Inc., Irvine, CA (US)

(72) Inventor: Carlos Del Toro, Whittier, CA (US)

(73) Assignee: Incipio Technologies, Inc., Irvine, CA (US)

( * ) Notice: Subject to any disclaimer, the term of this patent is extended or adjusted under 35 U.S.C. 154(b) by 0 days.

(21) Appl. No.: 14/512,298

(22) Filed: Oct. 10, 2014

(65) Prior Publication Data

US 2015/0122883 A1     May 7, 2015

Related U.S. Application Data

(60) Provisional application No. 61/900,979, filed on Nov. 6, 2013.

(51) Int. Cl.
   *G06F 17/30*         (2006.01)
   *G06F 1/16*          (2006.01)

(52) U.S. Cl.
   CPC .............. *G06F 17/30* (2013.01); *G06F 1/1628* (2013.01)

(58) Field of Classification Search
   CPC ............. G06F 1/1632; G06K 19/0723; G06Q 20/347; G06Q 20/322; G06Q 20/3226; G06Q 20/34; G06Q 20/352; H04B 1/3888; H04M 1/0254; H04M 1/72575; H04M 2250/14; H04W 4/008; A45C 13/002; A45C 2001/065; A45C 2011/003
   See application file for complete search history.

(56) References Cited

U.S. PATENT DOCUMENTS

| | | | |
|---|---|---|---|
| 2003/0085288 A1* | 5/2003 | Luu ............................... | 235/492 |
| 2005/0035860 A1* | 2/2005 | Taylor et al. ............... | 340/572.1 |
| 2005/0286212 A1* | 12/2005 | Brignone et al. ............. | 361/679 |
| 2006/0168644 A1* | 7/2006 | Richter et al. ................... | 726/2 |
| 2009/0069061 A1* | 3/2009 | Laurent .................. | H01Q 1/245 455/575.7 |
| 2009/0319561 A1* | 12/2009 | Hosp et al. ................ | 707/103 R |
| 2010/0038269 A1* | 2/2010 | Picard ........................ | 206/307.1 |
| 2013/0102367 A1* | 4/2013 | Kong ............................. | 455/571 |
| 2013/0146661 A1* | 6/2013 | Melbrod et al. .............. | 235/435 |

(Continued)

OTHER PUBLICATIONS

International Standard ISO/IEC 18092, Information Technology—Telecommunications and information exchange between systems—Near Field Communication—Interface and Protocol (NFCIP-1), Second edition, Mar. 15, 2013.

*Primary Examiner* — Thien M Le
*Assistant Examiner* — Claude J Brown
(74) *Attorney, Agent, or Firm* — Manatt, Phelps & Phillips, LLP (57) ABSTRACT

Removable cases for portable electronic devices incorporating memory tags (e.g., NFC memory tags) capable of being read by an electronic reading device are disclosed. The memory tags may be pre-programmed or programmable to contain one or more readable items of identification data associated with the custodian of the device or protective case. The memory tags may also or alternatively include code or executable commands that effectuate certain functionality (e.g., go into silent or airplane mode, call home or a particular person, turn off, check email, set alarm, play music or video, etc.) in another of the user's device. The protective case may protect, shield, and/or conceal the tag visually in part or in whole while allowing the tag to be read and the tags position visually identified. Systems and methods to recover lost or misplaced electronic devices using information contained in the memory tag of the protective enclosure are also disclosed.

12 Claims, 6 Drawing Sheets

(56) References Cited

U.S. PATENT DOCUMENTS

2013/0281014 A1* 10/2013 Frankland et al. ............ 455/41.1
2013/0281113 A1* 10/2013 Schlaupitz et al. ......... 455/456.1
2014/0148223 A1* 5/2014 Wenger et al. ................. 455/557
2014/0192492 A1* 7/2014 Wojcik et al. ................. 361/752
2014/0335790 A1* 11/2014 Dees et al. .................... 455/41.2

* cited by examiner

PROTECTIVE CASE FOR PORTABLE ELECTRONIC DEVICE

INCORPORATION BY REFERENCE TO RELATED APPLICATION

This application claims benefit under 35 U.S.C. §119(e) from U.S. Provisional Application No. 61/900,979, filed on Nov. 6, 2013, the disclosure of which is incorporated herein by reference in its entirety.

FIELD

This patent document generally relates to protective enclosures or cases for portable electronic devices such as hand-held or mobile smart and cellular phones, portable gaming, laptops computers, and electronic tablets and more specifically to such protective enclosures that include one or more pre-programmed and/or programmable readable memory tags, such as Radio Frequency ("RF") tags and in particular unpowered memory chips or tags that use Near Field Communication Interface and Protocol ("NFC memory tags").

BACKGROUND INFORMATION

Hand-held, mobile, and portable electronic devices such as smart and cellular phones, portable gaming, laptops, and electronic tablets are becoming more and more ubiquitous in today's society. In part due to their mobility and hence accessibility, users of such devices are increasingly relying on them to store and maintain personal and business data such as contacts, email, photos, account information, passwords, client, patient, or customer files, and various other important or difficult-to-regenerate information. As those who have ever lost such a device can attest, the cost of the lost device (while often not insignificant) frequently pales in magnitude to the grief the owner suffers as a result of the loss of and/or the inability to access the data or information contained on the lost device.

This problem is often exacerbated by the fact that the return of lost devices to their rightful owners is often not an easy task. Frequently, the lost device is password protected or protected by other means (e.g., biometric sensors or other security measures) that preclude even the best intentioned person from determining who the device should be rightfully returned to. Indeed, common carriers like airlines and the like have reported large quantities of unreturned electronic devices, which they have been unable to trace back to their rightful owners or passengers due to lack of identification information or their inability to access the device because of password or security protection. Some users, perhaps to improve their chances of recovery, provide contact information on the exterior of the electronic device, for example by scribing or placing a sticker on the device that contains the name, company, address and/or telephone number of the user and/or owner. Many users, however, prefer not to do so for reasons of privacy or as an added security precaution to avoid making the device a target for theft, misappropriation, and the like. Moreover, such exteriorly positioned labels are frequently inadvertently damaged, removed, or become unreadable with time.

While conventional protective cases for such devices provide protection from loss of the device as a result of physical damage from the environment or impacts and the like, they do not assist in the return of such valued property to their rightful owners while also overcoming the foregoing privacy and security concerns.

Applicant here recognizes that there is a need in the art for protective cases or enclosures that can assist in the return of the device to its proper custodian (e.g., user or owner or agent thereof) and do so without indiscriminately revealing personal contact information. Applicant has also recognized that there is a need in the art for protective cases or enclosures that are capable of electronically instructing another of the user's electronic devices to perform a specified task or function.

SUMMARY

New and improved protective cases for portable electronic devices such as hand-held or mobile smart and cellular phones, portable gaming, laptops, and electronic tablets are disclosed. Aspects are disclosed throughout and include those summarized herein.

Various aspects relate to such protective cases or enclosures that include one or more RF memory tags (such as NFC memory tags) capable of being read by an electronic reading device, such as an NFC device. Many phones, smart phones, and PDAs that use the Android or Windows operating system are now capable of reading NFC memory tags and would therefore fall within the scope of what is considered an NFC device or reading device for purposes of this patent document. The memory tag can be pre-programmed (in whole or in part) or be user programmable (using an appropriate programming device such as an NFC device) to contain or store, in the tags readable memory, identification data and/or executable commands or instructions.

Additional aspects relate to the nature and content of the identification data contained in the memory tag or used in connection with recovering. The identification data may be comprised of one or more items of data. Each item may be comprised of a single or a group of characters, symbols, or values including, but not limited to, numeric, alphabetical or alpha-numeric character strings that identifies or is associated, directly or indirectly, with: (a) a custodian of the electronic device and/or protective enclosure; (b) the protective enclosure; and/or (c) the electronic device that is enclosed within the protective case. For purposes of this patent document the term "custodian" when used in connection with an item (e.g., device or case) should be interpreted to encompass a person or entity that is, or represents to be, the rightful possessor, guardian, keeper, user, or owner of the item and/or agent or representative of such person or entity and/or location or address associated with such person or entity. The identification data may comprise a specific or unique string of characters or values, such as a personal pin number, password, or registration number that is correlated or otherwise corresponds to a custodian of the electronic device and/or protective case.

The identification data may constitute or be comprised of contact information for the custodian of the electronic device and/or protective case. The contact information may include a name, mailing address, email address, telephone number, and/or any information that identifies or provides a means to contact, directly or indirectly, the custodian of the electronic device and/or protective case.

The identification data may also constitute or be comprised of a link (e.g., to a website) or electronic address to a database center from which additional information relating to a custodian of the electronic device and/or protective case may be obtained.

Other aspects relate to the construction of the protective case and how and where the memory tag is located therein or thereon. The memory tag may be incorporated into the case so that it is protected, shielded, and/or visually concealed in part or in whole. In a preferred implementation, the memory tags described in this patent document are NFC memory tags embedded within a wall, component or cover of the protective enclosure (either partially or fully visually concealed, shielded or protected from impact or abrasion), for example, between two adjacent layers or panels that form a cover of the case. In other implementations, the memory tag may be positioned on the surface of the case or is removably inserted within a user accessible retention pocket secured on, or incorporated into, the case. The protective case may include multiple NFC or memory tags that contain the same or different items of identification data and/or executable commands.

Other aspects relate to visual markers or identifiers on the protective case or enclosure that correspond, specify or otherwise identify the location of concealed memory tags. The protective case may include a visual marker or indicator (e.g., symbol and/or text) associated with or otherwise positioned to identify the location of a concealed memory tag and/or the optimal location to position or tap the reading device to read or interact with the memory tag. The visual marker may contain markings that communicate the existence of the memory tag within the protective case and/or relevance or functionality of the memory tag (e.g., that the case contains an NFC memory tag that has contact information of the owner or custodian and/or will lead to the proper return of the lost device). The visual markers may be adhesive labels positioned on top of the outer surface of the case or may be markings that are permanently inscribed, printed or molded into the outers surface of the case and visible to the user.

Other aspects relate to systems and methods employing a protective case comprising one or more NFC or memory tags used for recovery of lost/misplaced electronic devices. The NFC memory tag itself (if visibly positioned) or a visual identifier visually communicates (alert, notify, inform, or display to the possessor) the existence of the memory tag and the tag's contents (e.g., that it contains identification information relating to the custodian). A reading device, such as a properly equipped smart phone, may then be used to read the NFC memory tag (e.g., by tapping the reading device to the tag). The identification data contained within the memory tag would be communicated to the reading device. When the identification data includes contact information regarding the custodian of the electronic device and/or protective case, the reading device, in one implementation, would reveal or display that contact information and/or any instructions regarding how or what steps are to be taken to return the lost item. The recipient of that information could then take the appropriate steps to contact and return the device and/or protective case to the appropriate person or location.

When the identification data includes an electronic link to a database center (e.g., to a website), where additional information relating to a custodian of the electronic device and/or protective case may be obtained, the identification data may serve as a mechanism to access that information to facilitate the return of the lost item. Thus, the NFC memory tag may include a website address and instruction directing the reader to visit the website in order to facilitate return of the lost/misplaced item to its rightful custodian or owner. Alternatively, the NFC memory tag may include commands or instructions that results in the NFC device automatically linking to the website. The website may have instruction that informs the visitor or reader on how to return the lost device to its appropriate custodian. Once on the website or linked site, identification data (e.g., unique identifier or other item of identification data) requested by the website and obtained by the reading device from the NFC memory tag may be inputted or communicated either automatically (via instructions contained in the NFC memory tag) or manually (via user input). Once the website receives the identification data, it matches it-up (using a comparative database) with custodian information corresponding to the inputted identification data item. The website may alert or send a message back to the reading device providing the contact information contained in its database and/or providing instructions to the reading device on steps to take to contact the rightful custodian and/or to return the lost item. The contact information data retrieved from the database, that is transmitted or communicated to the reading device, may include a telephone number, a mailing address, or an email address for the rightful custodian. The website may also or alternatively send a message or otherwise contact the rightful custodian and alert the custodian that the lost device has been found and provide contact information relating obtained from the reading device and/or provide updates on the status of return of the device. The website may also contact the custodian and ask for and/or obtain instructions as to what information should be sent to the reading device or what method or mode of return is preferred and communicate that information to the reading device.

For example, upon receipt of an appropriate identification data item the website would determine the corresponding contact information from a database (e.g., the email address of the registered custodian), then send a notice the custodian using the contact information advising the custodian that the device has been found and asking whether to send the custodian's contact information on file or some other information or contact information back to the reading device. While the foregoing implementation is described in terms of link to a website, any database center, such as an automated telephonic database call center may be substituted therefor. In such a call center, communications may be in the form of telephone calls and/or text messaging and interfacing may be in the form of voice recognition and/or dial tone recognition.

Another aspect relates to pre-programmed and/or user programmable memory tags that contain executable instructions directing the reading device to automatically send one or more items of information stored in the memory tag to one or more recipients specified by contact information also stored in the same or different memory tag. The contact information stored in the memory tag may include one or more electronic addresses (such as a website, email, text messaging addresses, or telephone numbers, etc.). The information sent to the contact address may relate to the identification of the electronic device and/or the electronic enclosure (e.g., unique identifier), the location and/or information relating to the reading device. Information sent to the recipient at the contact address may, by way of example, include GPS data on the device used to read the memory tag, a unique identifier of the device used to read the memory tag, and/or information contained in the device used to read the memory that identifies the device, the owner, user or custodian of the reading device (e.g., by name and address, telephone number, email, etc.).

Another aspect relates to protective enclosure having one or more memory tags that are pre-programmed and/or user programmable or programmed with one or more instructions readable and executable by another of the user's electronic devices (e.g. user's smart phone). The memory tags may be incorporated in various or different locations concealed, shielded, and protected in the case and/or positioned on the surface of the case. The instruction may include, but are not limited to, commands instructing the smart phone (i.e., the users secondary device) to (i) go into silent or airplane mode (like when the user is attending a meeting and doesn't want to have interruptions), (ii) call home or a specified person, (iii) turn off or go to sleep mode, (iv) check email, (v) set alarm, (vi) play music or video, or (vii) start a specified software application, etc. These executable task memory tags may be incorporated in a protective case with or without the identification storage memory tags that contain identification data.

Additional aspects relate to a protective case, in all of its various implementations as described herein, being part of a kit that includes additional unattached un-programmed and/or pre-programmed NFC memory tags that are adapted to be positioned (e.g., for example by the user via an adhesive backing) on the case and/or on the electronic device in a location desired by the user. The additional NFC memory tags may be pre-numbered or pre-marked with identifiers or may be made of material that allows the user to pen-in, pencil-in or otherwise label the memory tag. An NFC memory tag ledger may also be incorporated into the case or included as part of the kit. The NFC memory tag ledger is configured, such as with columns and rows, to correlate each NFC memory tag with a corresponding description of functionality. For pre-programmed memory tags the identification and description of the functionality may be pre-marked in the ledger. For user programmable memory tags, the functionality associated by the user for those tags may be provided by the user on labels that are included with the case or part of the kit. In one embodiment, the user labels can be removably inserted into appropriately sized and configured compartments of the ledger.

It should be understood that while certain aspects of the invention disclosed herein are summarized above and examples of implementations provided, the disclosure here contemplates that any of the aspects or teachings thereof may be combined with any of the other aspects or teachings thereof without limitation.

DESCRIPTION OF THE DRAWINGS

The details of the invention, both as to its structure and operation, may be further understood, at least in part, by study of the accompanying figures, in which like reference numerals refer to like parts. The components in the figures are not necessarily to scale; emphasis instead is placed upon illustrating the principles of the various aspects of the invention. Moreover, all illustrations are intended to convey concepts, where relative sizes, shapes and other detailed attributes may be illustrated schematically rather than literally or precisely.

FIG. 4 is a perspective view of the protective enclosure of FIG. 1 when the protective enclosure is open with an inner panel and outer panel of the front cover being separated to reveal memory tags residing there-between.

FIG. 5 is a front perspective view of the protective enclosure of FIG. 1 with the outer panel of the front cover being partially peeled away from the inner panel to reveal a memory tag residing there-between.

DESCRIPTION OF EMBODIMENTS

Disclosed herein are embodiments of a protective enclosure that include one or more pre-programmed and/or programmable readable memory tags, such as RF tags and in particular near field communication ("NFC") memory tags. Near field communication or NFC refers to a set of standards for smartphones and similar devices that are used to establish radio communication with each other by touching them together or bringing them into close proximity, usually no more than a few inches. See ISO/IEC 18092:2013 at http://standards.iso.org/ittf/PubliclyAvailableStandards/index.html. NFC memory tags are basically unpowered NFC chips that are capable of communicating or interfacing with an NFC device. Many phones, smart phones, and PDAs that use the Android or Windows operating system are capable of reading NFC memory tags and would therefore fall within the scope of what is considered an NFC device or reading device for purposes of this patent document. Such devices typically include software or programs capable of both reading and programming NFC memory tags.

The embodiments disclosed herein are described in the context of a protective enclosure for a portable electronic device because the embodiments disclosed herein have particular utility in this context. It should be understood, however, that the teachings herein may also be applied to other types of protective enclosures such as, but not limited to, wallets, purses, suitcases, and the like. Also, while the preferred embodiments illustrate an enclosure that is removably secured to the electronic device, it should be understood that the enclosure including the memory tags described herein could be an integral part of the electronic device itself.

Figure 1:
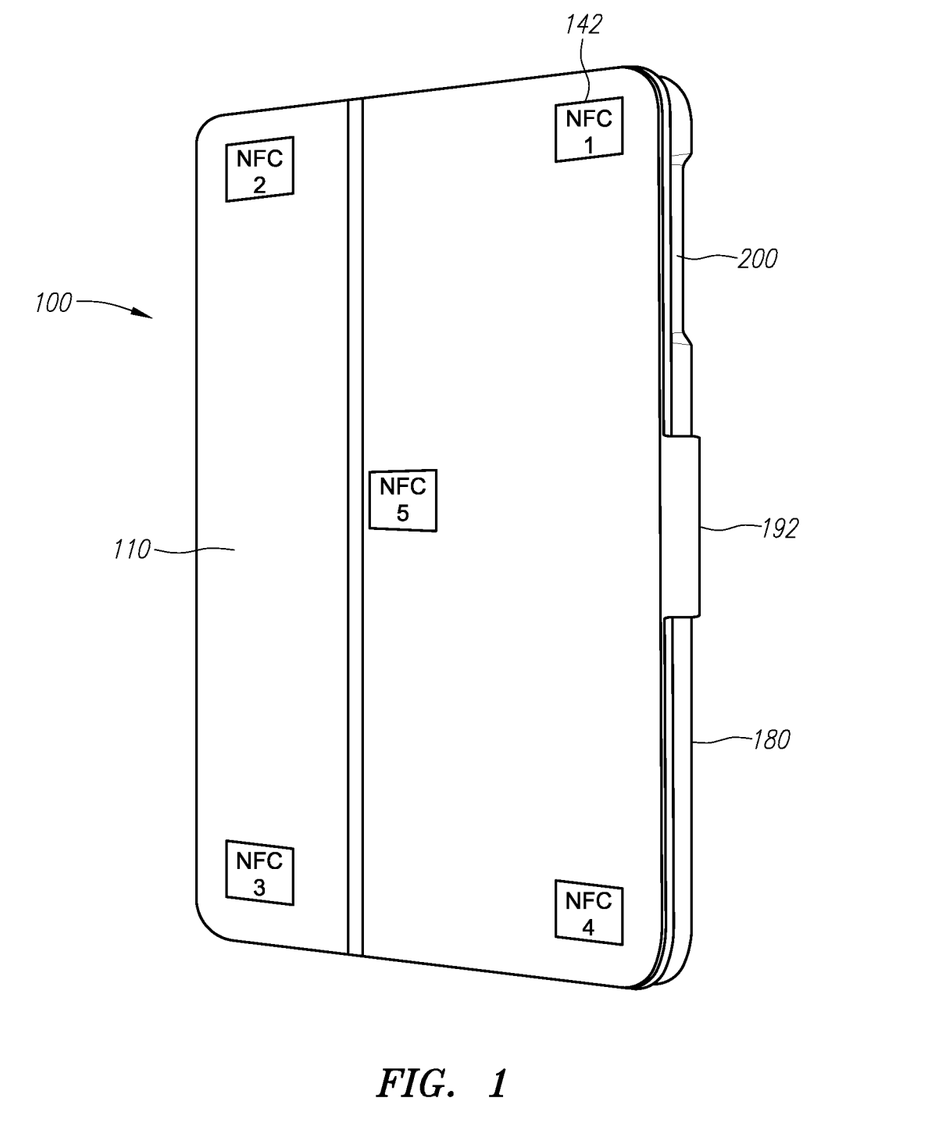
FIG. 1 is a front perspective view of an embodiment of a protective enclosure for a portable electronic device, such as a tablet device, which is contained therein.
Figure 2:
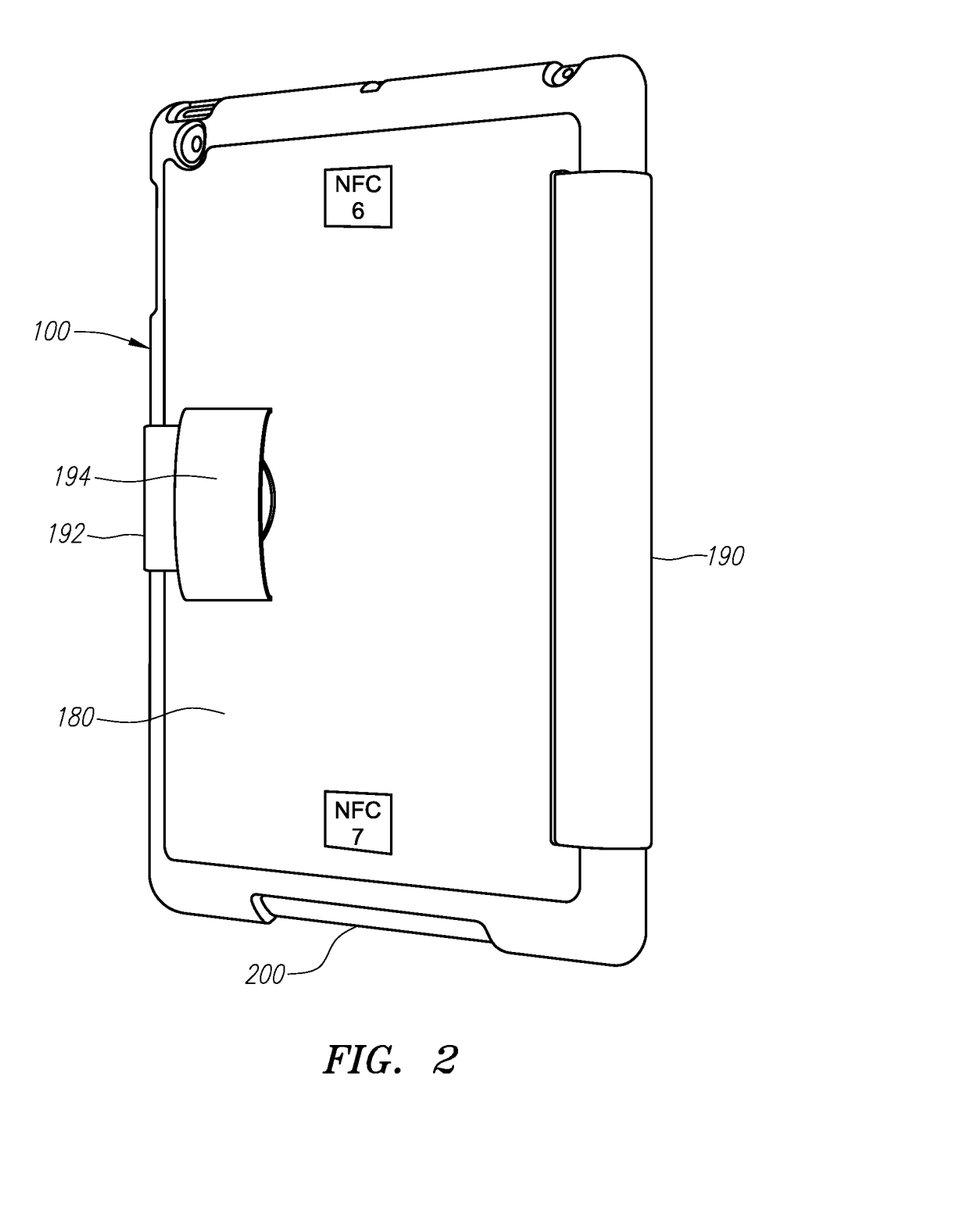
FIG. 2 is a rear perspective view of the protective enclosure of FIG. 1.

Illustrated in FIGS. 1 and 2 is an embodiment of a protective enclosure 100 for a portable electronic device with the portable electronic device 200 contained therein. The portable electronic device 200, such as smart cellular phone, portable gaming, laptop and electronic tablet, generally has a front face with a user interface, such as a touch screen, and a rear face. The protective enclosure 100 illustrated includes a front cover 110, a rear cover 180, and a spine 190 to connect the front cover 110 and the rear cover 180 as depicted in FIGS. 1 and 2. The protective enclosure 100 may have a closing mechanism such as the tab 192 and loop 194 best depicted in FIG. 2 to secure the front cover of the case over the portable electronic device 200 and further secure device in the case.

It should be understood, however, that the protective enclosure 100 can comprise and configuration including but not limited to being comprised of only a single cover to protect generally the rear and/or front face of the portable electronic device 200 or some specified region of the device. In addition, the protective enclosure 100 may be configured to take other forms or shapes to protect the article enclosed therein or protected thereby and may be employed in waterproof or water-resistant enclosures for electronic devices including cell phones and the like.

Figure 3:
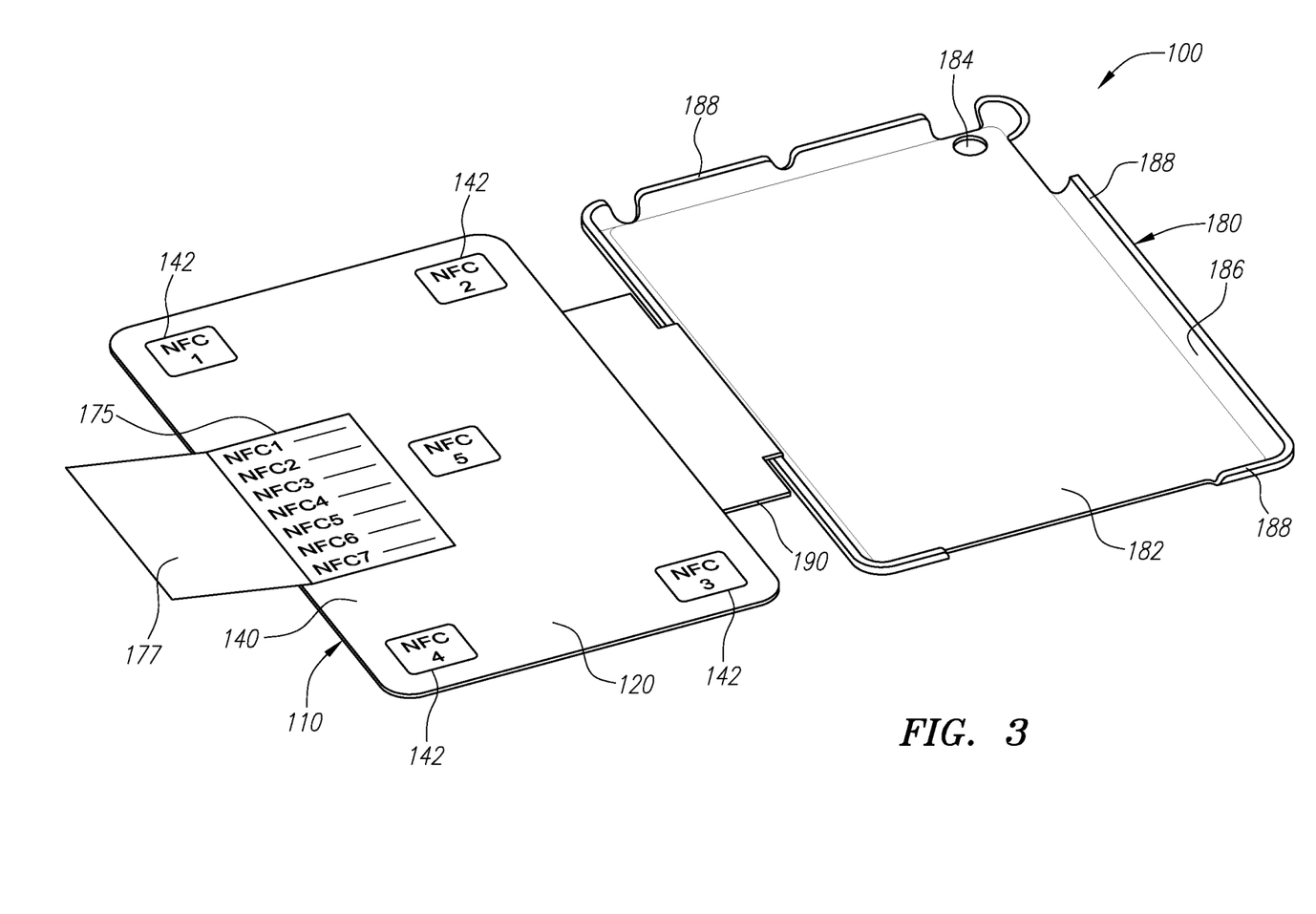
FIG. 3 is a perspective view of the protective enclosure of FIG. 1 when the protective enclosure is open and the portable electronic tablet device is removed.

Illustrated in FIG. 3 is an embodiment of the protective enclosure 100 of FIG. 1 that is in an open configuration and without the portable electronic tablet device 200 being contained therein. It is contemplated that the rear cover 180 may be used to hold or retain the portable electronic device 200 so that when the portable electronic device 200 is inserted into the protective enclosure 100, the rear face of the portable electronic device 200 is facing the inner side 182 of the rear cover 180 and the front face of the device 200 (which may include a touch screen or other user interface) is facing in the opposite direction. The front face and user interface of the device 200 is therefore accessible to the user through the user interface aperture 186 defined by the inner perimeter retention edge 188 of the rear cover 180. The retention edge 188 is dimensioned and configured to retain the device 200 in the rear cover 180. The rear cover 180 may also have additional apertures or windows 184 to facilitate use of the electronic device, such as a camera aperture, volume switches, on/off buttons or switches, etc.

Figure 5:
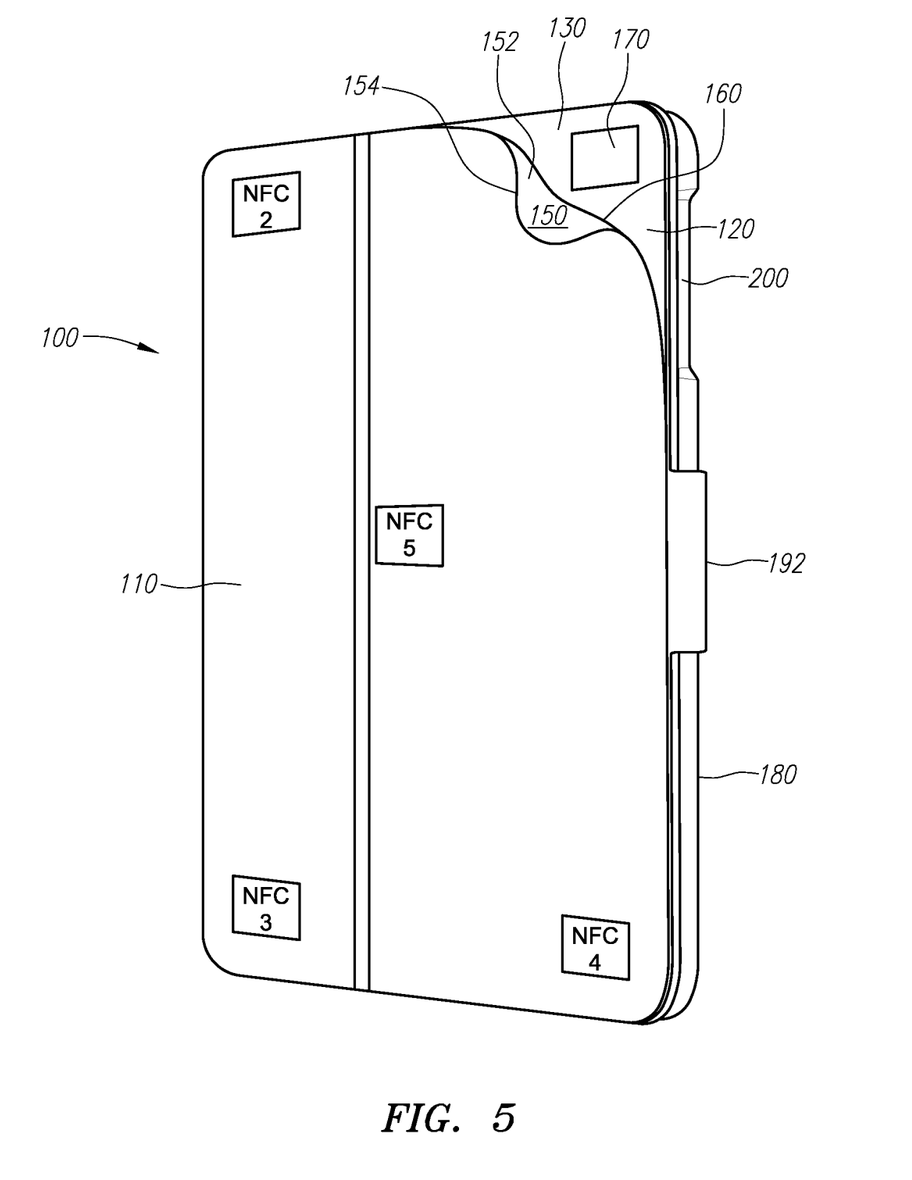

The front cover 110 may comprise an inner panel 120 having an inner face 130 and an outer face 140 and an outer panel 150 also having an inner face 152 and an outer face 154 with an interface region 160 being defined between the inner faces 130 and 140 of the inner and outer panels 120 and 150. Each panel may be made of one or more layers or plies of materials. When the portable electronic device 200 is inserted into the protective enclosure 100 and the protective enclosure 100 is closed, as shown in FIG. 5, the outer face 140 (which can be made of a soft protective fabric such as micro-suede or the like) of the inner panel 120 is configured to face and cover the outwardly facing user interface touch screen surface of the portable electronic device 200. The outer panel 150 of the front cover 110 may be formed of any suitable material, for example, vegan leather to provide sophisticated protection.

Figure 4:
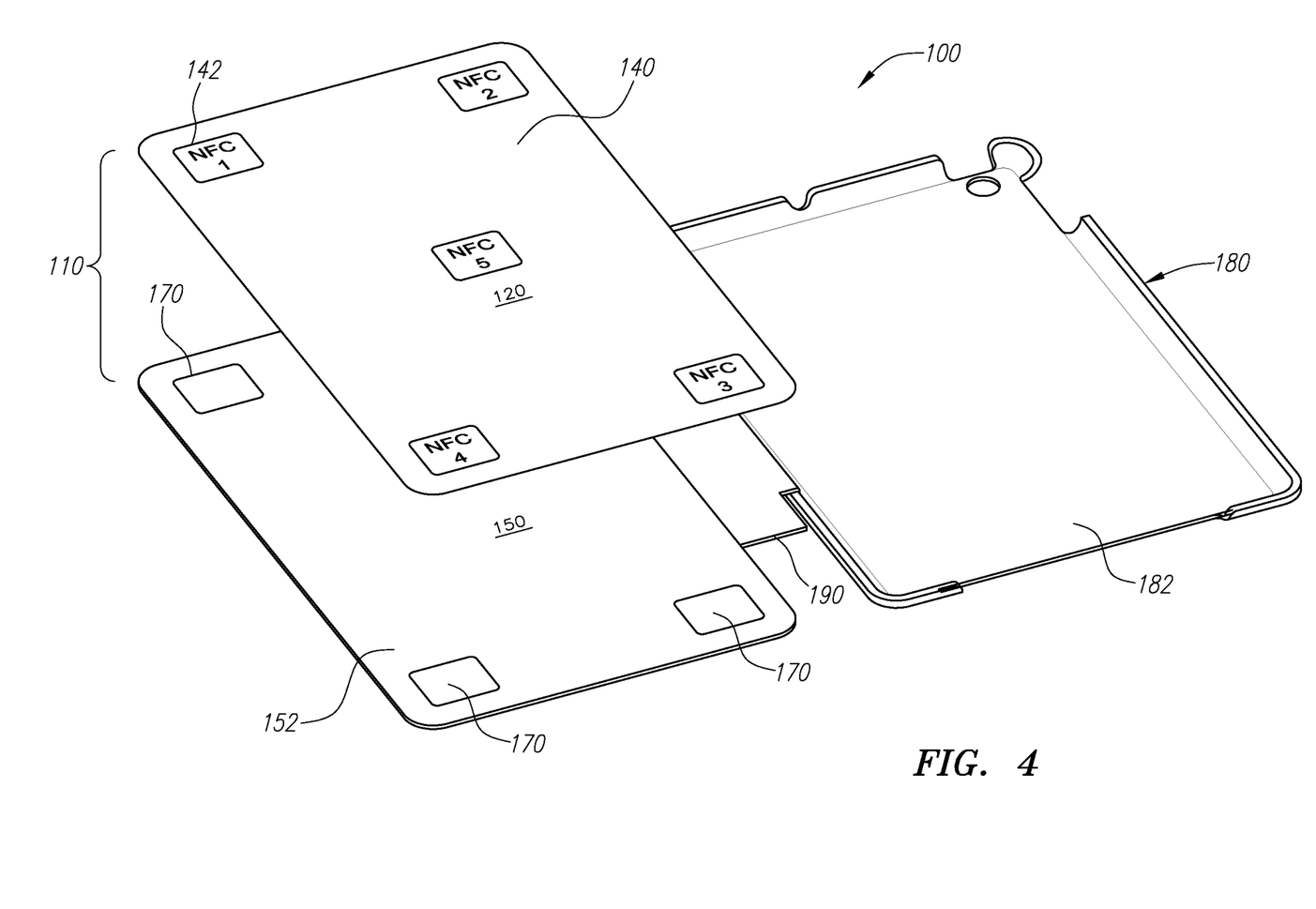

FIG. 4, which shows the inner panel 120 of the front cover 110 being separated from the outer panel 150 to reveal an NFC memory tag 170 residing there-between. Similarly, FIG. 5 shows the case 100 with the outer panel 150 of the front cover 110 being peeled away from the inner panel 120 of the front cover 110 at one corner to reveal an NFC memory tag 170 positioned at the interface 160 between the inner and outer panels 120 and 150.

The case and covers thereof may be constructed of materials that provide sufficient rigidity in the region where the memory tag is positioned so that the memory tag is suitably supported to resist undesired amounts of bending so that the memory tag is maintained in an operative condition. While a multi-layered case is disclosed, it should be understood that the cover need not be made of a multi-layered construct. On or more of the components of the protective case (e.g., front and back covers) may be formed of an injected-molded polymer or other unitary construction and the memory tags may be embedded therein—either, fully or partially concealed within. Specifically it is contemplated that NFC memory tags are positioned within a mold and co-molded into the case construct. The case covers or components (including those of unitary construction) may be painted or overlaid with one or more plies or layers to provide the desired look and feel.

It should be understood that multiple NFC memory tags 170 may be positioned in various locations on the case 100. For examples at each of the corners and/or a central region of one or more of the covers or components of the case 100 as illustrated in FIGS. 3-5.

In the embodiments illustrated in the drawings, the NFC tags are concealed, shielded and protected within a component of the case such as the cover or case wall and in particular between two plies or panels of a cover. Each of the concealed NFC memory tags 170 are visually identified by a memory tag marker 142 placed above the NFC memory tag 170 on the outer surface of the case 100, and in particular, on the outer face 154 of the outer panel and/or the outer face 140 of the inner panel 120 of the front cover 110. Each memory tag marker or identifier 142 may include a unique set of characters or markings (e.g., unique characters, symbols, alphanumeric, numeric etc. string of characters) to provide unique geographical correlation with an underlying NFC memory tag 170 concealed within the case 100. For example the NFC tag markers depicted in the drawings employ alpha-numeric designations "NFC 1", "NFC 2", "NFC 3" . . . "NFC 7".

The visual markers 142 in addition to identifying the location and existence of the memory tag, so that possessor knows of its existence and where to position the reading device to read the tag, the visual marker 142 may also identify or describe the relevance of the tag (e.g., that it contains the contact information of the owner or directs user to a source for the contact information or whatever task or instruction it is programmed to execute on the reading device). Thus, the markings on "NFC 1" for example may be changed to read "NFC Data Re: Custodian Contact Information". The visual markers 142 may be labels that are mechanically, adhesively, or otherwise attached to the surface of the case, or may be markings that are more permanent such as being printed, scribed or molded into the case at the memory tag 170.

Similarly, while NFC memory tags 170 are, in the embodiment illustrated in the drawings, embedded or incorporated within the walls of the case cover, it is contemplated that one or more of the memory tags may be adhered or otherwise attached to the outer surface of the case cover, or be removably incorporated into the case cover, such as within a user accessible pocket that may be formed for example by a layer of material that is mechanically, adhesively or otherwise secured to or within one or more of the case 100 components or covers.

Figure 6:
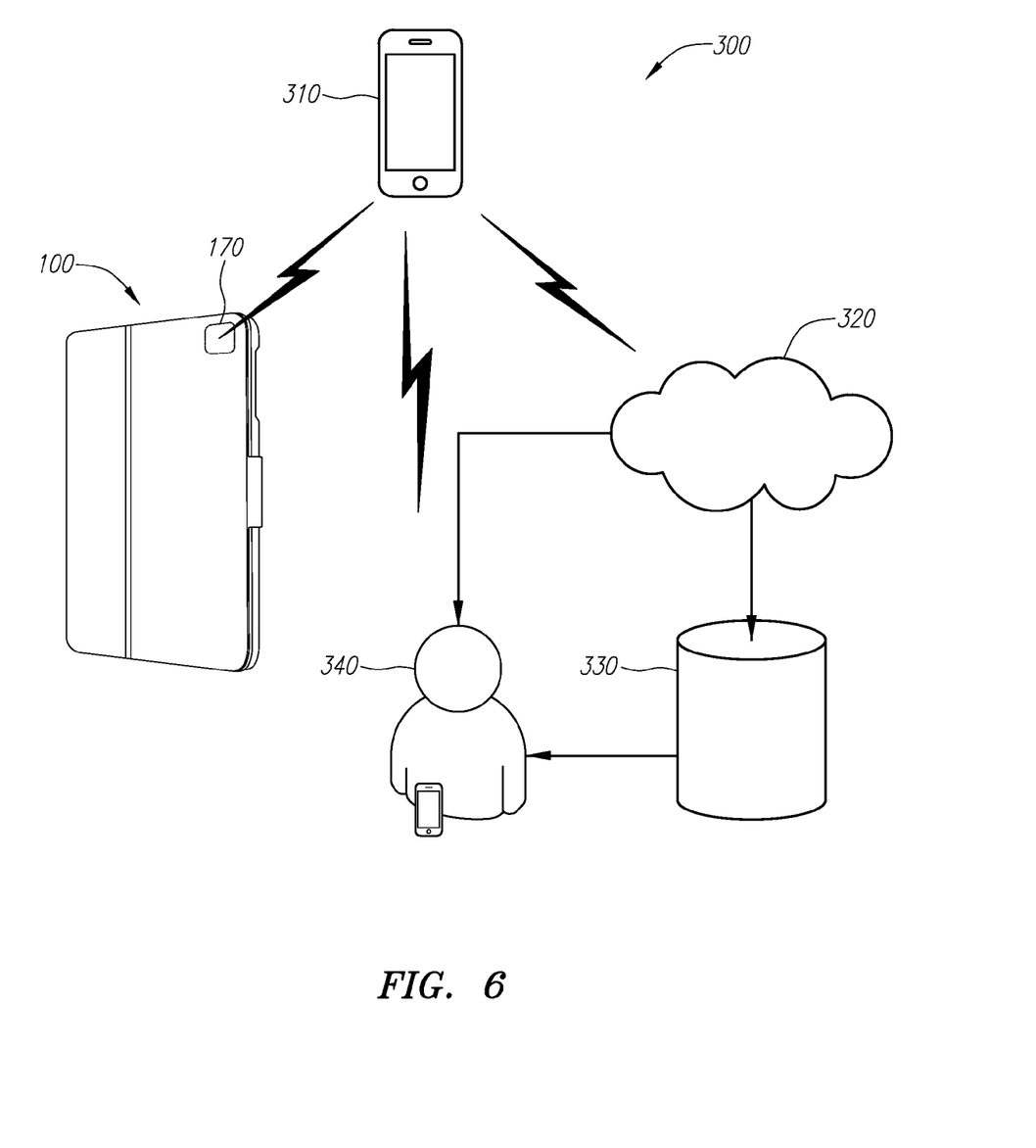
FIG. 6 is a schematic illustration of a system and process for recovering a lost portable electronic device having a protective enclosure of FIG. 1.

FIG. 6 shows various components of a system to assist in the recovery of lost electronic devices 200. The system 300 includes a case 100 containing an electronic device 200 having at least one NFC memory tag 170, an NFC or memory tag reading device 310, that can interface with and read the NFC or memory tag, a wireless network such as the internet 320 that can interface with the reading device 310, a database center 330 which may be interactively accessible by the reading device, telephonically or via website, to provide information to and from the registered custodian 340 of the device 200 and/or protective case 100. The database center 330 may be operated or associated with the manufacturer or supplier of the electronic device and/or the protective enclosure 100. The database center 330 includes or has access to one or more databases that individually or collectively store and correlates information relating to the custodian of the electronic device and/or protective case with information stored in the NFC or memory tag 170.

The database can, in whole or in part, be generated at or from point of purchase data. The database can, in whole or in part, be generated via a registration system (for example, the registrant provides identification data (e.g., name, address, email, telephone number, unique identifier that corresponds to the electronic device and/or case). The database may be generated in part by point of purchase data, purchase data, manufacturing data, sales data, and registration data or any combination thereof. The database can be interactive to allow for changes or updates of identification data of the custodian.

To assist in recovery, one or more NFC memory tags 170 can be pre-programmed or user programmable to contain one or more items of identification data. The identification data, or item thereof, may be comprised of a single or any group of characters, symbols, or values including, but not limited to, numeric, alphabetical or alpha-numeric character strings that identifies or is associated, directly or indirectly, with the identity of: (a) the custodian of the electronic device and/or protective enclosure or agent thereof (b) the protective enclosure; and/or (c) the electronic device that is enclosed within the protective case. For purposes of this patent document the term "custodian" when used in connection with an item (e.g., device or case) should be interpreted to encompass a person or entity that is, or represents to be, the rightful possessor, guardian, keeper, user, or owner of the item and/or agent or representative of such person or entity and/or location or address of such person or entity. For example, a custodian encompasses a person that registers the purchase of the electronic device and/or protective case (i.e., a registrant). The identification data may be a unique or specific identifier or string of values, for example a personal pin number, password, or registration number that is registered, correlated, or otherwise corresponds to the custodian of the electronic device and/or protective case.

The identification data may constitute or be comprised of contact information for the custodian 340 of the electronic device 200 and/or protective case 100. The contact information may include a name, mailing address, email address, telephone number, and/or any information that identifies or provides a means to contact a person, entity, service, or system that is directly or indirectly associated with a custodian or the electronic device and/or protective case. The contact information may itself constitute, in whole or in part, the unique identifier or may be incorporated therein. For example, the identification data may be comprised of an email address of a custodian, which in addition to being contact information, may also serve as a unique identifier.

The identification data may also include, in whole or in part, a link or electronic address, or telephone number to a database center 330. The data base center 330 may be a website and the identification data may be a website address or link thereto or may be a set of commands or instructions that when performed by the reading device 310 connects the reading device 310 to the database center or website 330 or a particular page thereon. The database center 330 may also be a telephone call center such as an automated call center. The database center 330 either maintains and/or has access to data stored in a database relating to custodian 340 of the electronic device 200 and/or protective case 100 that is correlated to the identification data stored in an identification memory tag 170. The identification data, such as a unique identifier, contact information or link, can be registered and maintained in a database 330 and correlated to information on the identity of the custodian of the electronic device and/or protective case.

In operation, the NFC memory tag 170 (if visible) or a visual identifier 142 would function to communicate or otherwise inform or alert (or display to) the possessor of a lost or misplaced device 200 that contact information associated with a rightful custodian (e.g., owner, user, etc.) of the lost/misplaced device 200 may be obtained by reading a designated/specified NFC memory tag 170. A reading device 310, such as a properly equipped smart phone, is used to read the identification data contained in the memory tag 170 by, for example, tapping the reading device 310 to the case 100 at or near the NFC memory tag 170 the location of which being identified by the tag itself 170 or a visual marker 142. Identification data contained or stored in the memory tag 170 would then be communicated to the reading device 310 to facilitate return of the device 200 and/or protective case 100 to the appropriate custodian 340.

For example, if the identification data stored in the memory tag 170 includes contact information for the custodian 340 of the electronic device 200 and/or case 100 (e.g., a telephone number or name and address (electronic, email, or mailing address), or any other information that directly or indirectly identifies the custodian), that contact information could be read, communicated to and displayed by the reading device 310. The contact information conveyed to the reading device 310 could include information or instruction on how or what steps are to be taken to return the lost item. For example, the contact information may advise the recipient to please call a particular telephone number, send an email to a particular email address, log-in to a particular website and input specified data items, or mail or return the article to a particular mailing address. Upon receipt the possessor of the lost item or recipient of the information could use that information to facilitate contacting the rightful custodian of the lost or misplaced item and/or returning the item to the proper custodian.

If the identification data includes contact information, such as email or text messaging information or a telephone number of the custodian 340 of the portable electronic device 200 and/or the protective enclosure 100, the reading device 310 can be instructed by the NFC memory tag 170 to send an email or text message to notify or alert the custodian 340 that the item had been found or seek instructions from the custodian 340. Responses or instructions received from the custodian 340 may be communicated via the custodian's cellphone, smart phone, computer or other suitable electronic device to the reading device 310 via the same route (e.g., via the internet, wireless or other network 320 or combination of networks to the reading device 310) or via a different route.

To the extent that the identification data contained in the memory tag 170 includes a unique identifier (e.g., a pin or password etc.), that information can be used to locate or determine the proper custodian. For example, the memory tag may include contact information, such as a telephone number for an automated call center or database center 330 that provides the caller with the contact information of a custodian after the unique identifier is provided (e.g., inputted verbally, typed-in, etc.).

In one implementation, the communication of the custodian contact information to the reading device 310 is premised on the occurrence of a condition precedent. For example, if a device is lost, the rightful custodian could contact the automated service (e.g., call center or website) and alert the service that the device is lost. The service or database center 330 would then allow the contact information of the custodian to be revealed should someone call in and provide the unique identifier or other information like device or case serial number or model etc. In this way, an added security measure is provided that does not allow revelation of personal custodian contact information until the device is reported lost by the registered custodian, owner or user. Other condition precedents may be registration for example of the case or electronic device and/or of the custodian; activation of device; or the receipt by the service of a unique identifier or other information like device or protective case serial number etc. Thus it is contemplated that the release or communication of custodian information (such as contact information) to an inquiring reading device is premised on an activation event such as a condition precedent.

When the memory tag 170 is pre-programmed and/or user programmable or programmed with a link to database center 330 (e.g., website), the identification data stored on the NFC memory tag 170 may serve as a mechanism or key to access custodian information stored or contained on or otherwise accessible by the website or database center. For example, the NFC memory tag 170 may include a website address and instructions directing the reader to visit the website 330 in order to facilitate the return the lost or misplaced item to its rightful owner or custodian 340.

Alternatively, the NFC memory tag 170 may include instructions or commands that automatically link the NFC reading device 310 to the website via the internet or wireless network 320. The website may have instruction on how to return the lost device to its appropriate custodian. Once on the website or linked site, the user may type in or otherwise input identification data (e.g., the unique identifier or other identification data) requested by the website or linked site and obtained from the NFC memory tag 170. The identification data information could be inputted or communicated either automatically via instructions contained in memory tag 170 or manually via user input, or a combination of both.

Once the website receives the identification data, it matches it-up (using a comparative database) with custodian information in the database corresponding to the inputted identification data item. The website may alert or send a message back to the reading device 310 providing the contact information contained in its database and/or providing instructions to the reading device 310 on steps to take to contact the rightful custodian and/or to return the lost item. The contact information data retrieved from the database, that is transmitted or communicated to the reading device, may include a telephone number, a mailing address, or an email address for the custodian.

The website or database center 330 may also or alternatively send a message or otherwise contact the custodian 340 and alert the custodian that the lost device has been found. The website can also provide (transmit or otherwise communicate) contact information relating to the reading device 310 and/or provide updates on the status of return of the device to the custodian 340. The website may also communicate with the custodian 340 to seek additional information relating to the communication and return of the lost item such as instructions as to what information should be sent to the reading device 310 or what method or mode of return is preferred. The website can then communicate that information to the reading device 310. For example, upon receipt of an appropriate identification data item, the website would determine the corresponding contact information from a database (e.g., the email address of the registered custodian), then send a notice to the custodian 340 using the contact information. The notice would advise or communicate to the custodian 340 that the device 200 has been found and inquire as to whether to send the contact information currently on file in the database or some other information or contact information back to the reading device 310.

The NFC memory tag 170 may also include instructions that instruct the reading device 310 to automatically send information stored in the NFC memory tag 170 to one or more recipients (e.g., 340 or website) specified by contact information also stored in a NFC memory tag 170. The contact information stored in the NFC memory tag 170 may include one or more electronic addresses (such as a website, email, text messaging addresses, or telephone numbers, etc.). The information sent to the contact address may relate to the identification of the electronic device and/or the electronic enclosure (e.g., unique identifier) and/or the location, and/or information relating to the reading device. For example, it is contemplated that such information sent to the contact address may include GPS or other information that identifies the reading device 310, its location, internet address or telephone number or some other information contained on the reading device such as information identifying the owner, user or custodian of the reading device (e.g., by name and address, telephone number, email, etc.) so as to facilitate contact. The reading device may read and send via the internet or other network 320 a unique identifier to a website identified in the memory tag 170. The website would then correlate this unique identifier to a database 330 and send a notification to the owner 340 that his lost device has been found and may also provide information on how to retrieve it or its location. One particular advantage of using a unique identifier is that website or intermediary database service provider can be the interface between the NFC reader 310 and owner 340 so that one or neither is in possession of the others contact information.

It should be understood that while the foregoing implementations to the extent described in terms of link to a website, any database center, such as an automated telephonic database call center, may be substituted therefor. In such a call center, communications may be in the form of telephone calls and/or text messaging and interfacing may be in the form of voice recognition and/or dial tone recognition.

While each of these recovery assisting systems and methods may be used discretely or independently, it should be understood that these methods could be used simultaneously in parallel or sequentially without limitation. For example, the reading device 310 could be provided the contact information of the custodian 340 of the lost device and also be instructed to send an email or text message to that custodian notifying the custodian that the lost device has been found, providing the location of that device and the contact information or address of the reading device or its owner or user.

The protective enclosure 100 may as illustrated in FIGS. 1-5 include one or more memory tags 170 that are pre-programmed and/or user programmable to interactively interface with another of the user's electronic devices capable of reading the memory tag (e.g., an NFC device). For example, one or more memory tags 170 may be incorporated in different locations in or on the surface of the protective enclosure 100 for the user's tablet 200 such as an iPad. The memory tags 170 may be programmed to be read with another of the user's NFC devices (e.g., the user's smartphone) and by doing so provide one or more task instructions or commands to the smartphone. For example those task instruction may include, but are not limited to, commands or code instructing the smartphone to: (i) go into silent or plane mode (like when the user is attending a meeting and doesn't want to have interruptions), (ii) call home or a specific person or device, (iii) turn off or go to sleep, (iv) check specified email account, (v) set alarm, (vi) play specific music or video or music or video source, (vii) start a particular software application, (viii) connect to or disconnect from another device, like a Bluetooth speaker or audio device, etc.

It should be understood that the construction of the case or enclosure 100, should be such that memory tags 170 can be read through the internal and/or external panel or surfaces of the protective case at the corner regions, the center regions, and/or a combination thereof. In other words the case 100 should be constructed in such manner so that it is sufficiently RF transparent to allow the reading device 310 to interface and read the NFC memory tag 170. Accordingly it is contemplated that one or more of the cover panels 110, 180 are made of a thin ply of polymer material that does not significantly obstruct the radio frequency communication between the NFC tag and the reading device. For example it is contemplated that the polymer material of the case 100 in the region overlying the memory tag 170 (e.g., the thickness of one of the cover panels 120, 150) be less than 1 mm thick, less than 0.8 mm thick, less than 0.5 mm thick, less than 0.3 mm thick, less than 0.1 mm thick, less than 0.08 mm thick, less than 0.05 mm thick, less than 0.02 mm thick, less than 0.01 mm thick.

The case 100 may also be part of a kit that includes additional unattached NFC memory tags (either pre-programmed and/or un-programmed) that the user can position (e.g., for example via an adhesive backing) on the case and/or on the electronic device in the desired location. The additional NFC memory tags may be pre-numbered or may be made of material that allows the user to pen or pencil in a number or character string.

In order to keep track of the functionality of each NFC memory tag, the case may also be comprised of an NFC memory tag ledger 175 that functions to correlate each memory tag 170 (using for example the memory tag marker or indicator) with a description of the nature of the information stored in the NFC memory tag 170 or what operation the memory tag is programmed to do. For example, a sample ledger 175, such as that illustrated in FIG. 3 may look like:

| NFC Tag # | Description |
|---|---|
| NFC1 | Custodian Contact Information/Return of Lost Device |
| NFC2 | Connect cell phone to Bluetooth speaker |
| NFC3 | Turn cell phone to silent mode |
| NFC4 | Turn cell phone off |
| NFC5 | Set email auto reply on cell phone to "out of office" |
| NFC6 | Set cell phone alarm to 6:00 am |
| NFC7 | Cell phone call home |
| NFC8 | Link to www.specifiedwebpage.com web page |

The NFC tag ledger 175 can be pre-filled by the manufacturer or custodian of the electronic device and/or parts or the entire ledger can be left blank and filled-out by the user. For example, it is contemplated that for NFC memory tags 170 that are pre-programmed by the manufacturer, the NFC Tag # and the description of what the corresponding memory tag 170 contains and/or does is provided in the ledger 175, while for memory tags that are included in the case 100 but are un-programmed or user programmable, the ledger 175 can be adapted so that the NFC Tag # and/or description can be provided by the user.

For example, the ledger 175 may include partitioned columns and rows configured to retain and display correspondingly dimensioned paper tabs or inserts. For example it is contemplated that a clear plastic layer can be stitched or adhered onto the case in such a manner wherein the stitching/ or lines of adhesion define the various columns and rows yet allows access thereto sufficient to insert the paper tabs or inserts. The user can write the identification and/or description of the memory tag 170 on the paper insert and insert it into the appropriate row and column of the partitioned plastic sheath. The ledger 175 may be positioned in any suitable place on the case and may be visible or concealed (partially or entirely) behind a removable or moveably hinged panel 177, which can be secured into position over the ledger 175 via any suitable mechanical latch or retention mechanism, magnetic attraction, adhesive or combination thereof to allow the user to remove the panel 177 from obstructing the ledger 175 to allow visibility of the contents of the ledger 175. While the NFC tag ledger may be incorporated into the case it may also be included as part of a kit that includes the case and additional NFC or memory tags and labels.

While the foregoing provides a description of the various aspects of the invention in connection with specific examples and various embodiments, it should be readily understood by those skilled in the art that many modifications and adaptations to that described herein are possible without departure from the spirit, scope or substance of the invention. Thus, it is to be clearly understood that this application is made only by way of example and not as a limitation on the scope of the invention claimed below. It should also be understood that any of the features and functionalities described herein, may be combined in any way with one another. The description is intended to cover any variations, uses or adaptation of the invention following, in general, the principles of the invention, and including such departures from the present disclosure as come within the known and customary practice within the art to which the invention pertains.

The invention claimed is:

1. A reversibly removable protective enclosure for enclosing and protecting a portable electronic device, said portable electronic device including an external casing that houses electronic components of the device, said protective enclosure comprising:
   a multi-component structure that includes at least a first component, a second component and a compartment configured to removably receive and retain the electronic device, the first component has an inner panel and an outer panel with an interface region being defined between the inner and outer panels; and
   an NFC memory tag contained within the interface region of the first component, wherein said NFC memory tag is irremovably concealed within the component and is programmed with identification data corresponding with a custodian of the electronic device.

2. The protective enclosure of claim 1, wherein said protective enclosure further includes additional programmable NFC memory tags.

3. The protective enclosure of claim 2, further comprising a ledger that is configured to correlate the identity of the NFC tag with a description of the functionality of the tag.

4. The protective enclosure of claim 1, wherein the identification data is comprised of an email address.

5. The protective enclosure of claim 1, wherein the identification data is comprised of a telephone number.

6. The protective enclosure of claim 1, wherein the identification data is comprised of a name.

7. The protective enclosure of claim 1, wherein the identification data is comprised of an address.

8. The protective enclosure of claim 1, wherein the custodian may be a user or owner of the electronic device.

9. The protective enclosure of claim 1, wherein the identification data correlates to the identity of the protective enclosure.

10. The protective enclosure of claim 1, wherein the identification data correlates to the identity of the electronic device.

11. The protective enclosure of claim 1, wherein the identification data correlates to the identity of a person that has registered electronic device or protective enclosure.

12. The protective enclosure of claim 1, further comprising a visual marker identifying the location of the memory tag on the enclosure.

\* \* \* \* \*